Patented Mar. 17, 1953

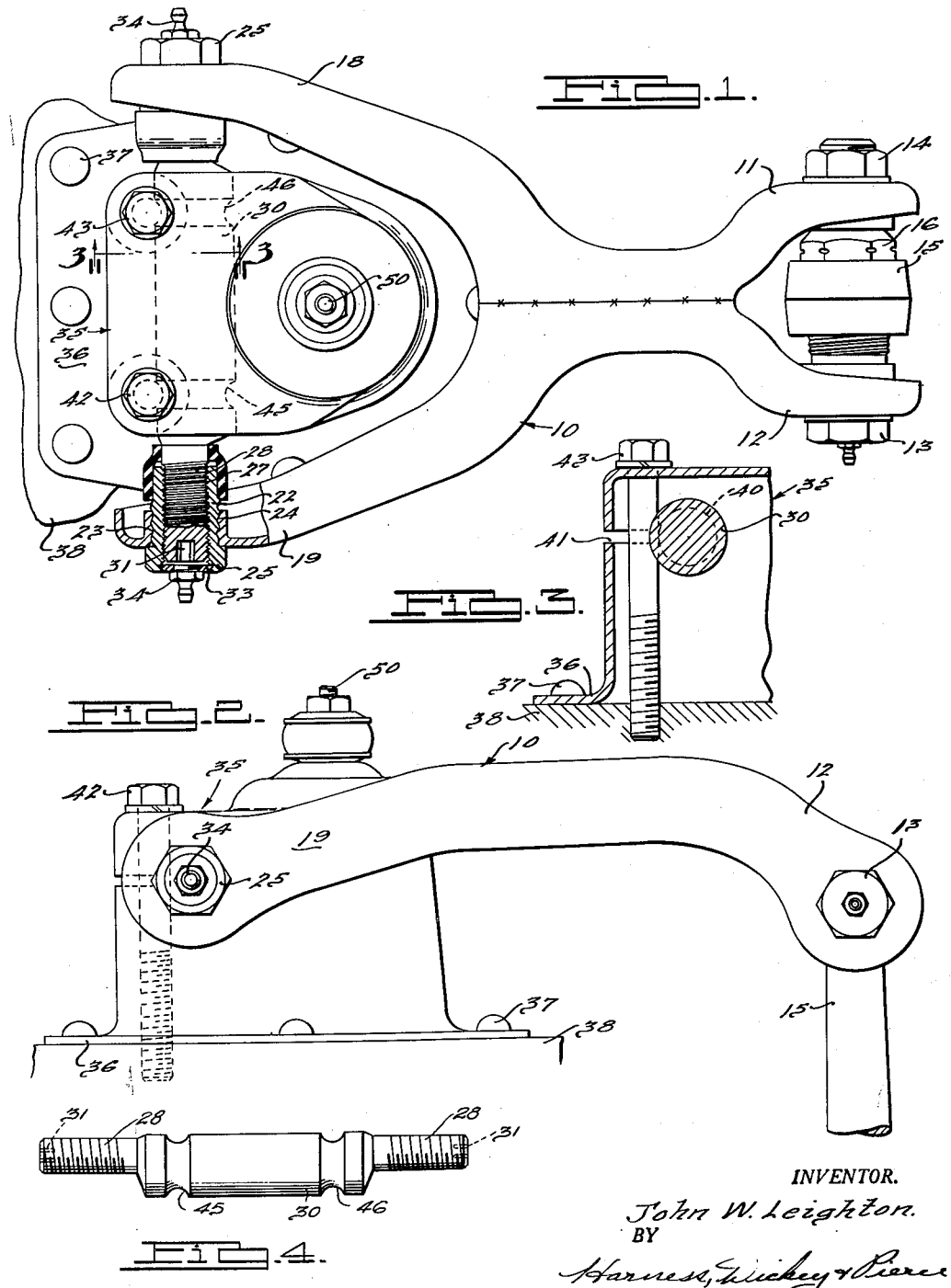

2,631,866

UNITED STATES PATENT OFFICE 2,631,866

MEANS FOR ADJUSTING THE ANGULARITY OF INDEPENDENTLY SPRUNG WHEELS

John W. Leighton, Port Huron, Mich.

Application September 11, 1947, Serial No. 773,436

6 Claims. (Cl. 280—96.2)

1

The invention relates to individual wheel suspensions and it has particular relation to devices for effecting camber and caster adjustments in suspensions for the front wheels of a motor vehicle.

One object of the invention is to provide an improved means for pivotally mounting the inner end of a wheel carrying arm or link to a vehicle frame, wherein the parts can be manufactured and assembled efficiently and inexpensively.

Another object of the invention is to provide an improved mounting of this character wherein a pivot or control bar is employed for effecting caster and camber adjustment.

Another object of the invention is to provide a mounting of the type indicated wherein the control bar can be manufactured from a machined bar stock in order to eliminate the more expensive process of forming the bar by forging operations.

Other objects of the invention will become apparent from the following specification, from the drawings relating thereto, and from the claims hereinafter set forth.

For a better understanding of the invention, reference may be had to the drawings wherein:

Figure 1 is a plan view of the upper arm of an individual wheel suspension constructed according to one form of the invention.

Figure 2 is a side elevational view of the structure shown by Figure 1.

Figure 3 is a cross sectional view taken substantially along the line 3—3 of Figure 1.

Figure 4 is a plan view of the control arm pivot bar.

Referring to the figures, the upper arm of the suspension is indicated generally at 10 and is shown as having a bifurcated outer end so as to provide separate portions 11 and 12. These portions are connected by a bolt 13 having a nut 14 on its threaded end so as to lock the bolt in place. Between the portions 11 and 12, the bolt extends through the upper end of a wheel mounting member 15 and between the opening in the latter and the threaded surface of the bolt a bushing 16 is provided. This type of construction is generally known and provides a threaded pivot bearing between the upper end of the wheel member 15 and the arm 10 to permit relative movement of the parts during operation of the vehicle.

At its inner end the arm 10 is also bifurcated to provide rather widely spaced parts 18 and 19. As shown in connection with arm 19 only, a bushing 22 is threaded into an opening 23 in the arm and this bushing has shallow external threads as indicated at 24 which bind the threaded end in the opening. This bushing is of a well known type and is forcefully threaded into the opening 23 so that the threads on the bushing generally form threads in the wall of the opening so as to lock the bushing in position. The bush-

2 ing has a head 25 for facilitating this threading operation and normally the bushing is turned until the head engages the side of the arm.

Each bushing has ordinary internal threads 27 and these respectively engage opposed threaded ends 28 of a control arm pivot bar 30. Therefore, the control bar can pivotally turn on the threaded bearings provided by the internal threads in the bushings. At least one end of the control bar has a socket type opening 31 in its end adapted to receive the end of a socket wrench so that the bar may be turned for adjustment purposes as presently will be mentioned. The outer end of the bushing adjacent the socket opening 31 is normally closed by a Welsh plug 33 having a grease fitting 34 threaded there into and access to the socket is obtained by removing the grease fitting. Normally the grease fitting forms a means of forcing lubricant into the bushing and along the threaded bearing.

The intermediate portion of the control bar 30, as shown by Figure 1, is enlarged and is eccentrically formed with respect to the threaded ends 28 of the bar. This eccentric portion extends through an inverted cup-shaped stamping or shell 35 having a flange 36 around its lower edge and this flange is riveted or otherwise secured, as indicated at 37, to a part of the vehicle frame indicated at 38. The eccentric portion of the control bar extends through openings 40 in opposed vertical walls of the shell and the inner wall of the shell is slotted as indicated at 41, with the slot extending through both of the adjacent side walls until it intersects the openings 40, so as to provide a means for clamping the shell about the control bar. This clamping action is effected by means of bolts 42 and 43 extending downwardly through the shell and threaded into the frame 38. It is evident that by tightening the bolts so as to draw the heads thereon against the upper side of the shell, the shell portions at opposite sides of the slot can be drawn together so as to tighten the shell strongly about the control bar and lock it against turning. In order to prevent the control bar from shifting axially, while permitting turning thereof when desired, it is provided with annular grooves 45 and 46 and the bolts 42 and 43, respectively, seat in the grooves.

The shell 35 also serves as a means for connecting the upper end of a vertically arranged, telescopic type shock absorber to the frame. This shock absorber extends upwardly through an opening in the frame and into the shell and includes a bolt 50 connected to the upper wall of the shell.

In operation of the suspension, the bolts 42 and 43 will be tight and the control bar 30 will not turn so that the arm 10 will merely swing about the threaded ends of the bar. If it is desired to change the camber adjustment, the bolts 42 and 43 are loosened and then control bar 30 is turned by inserting a wrench through the grease fitting opening and into the socket 31. The eccentric portion of the control bar will turn about the axis of the openings 40 in the shell and this will cause the threaded ends to move eccentrically with respect to such axis and thereby shift the arm 10 transversely of the frame. It is evident that any degree of camber adjustment can be effected in this way. Any turning of the control bar will also cause some shifting of the arm 10 longitudinally of the vehicle since the bushings will have to travel along the threads on the ends of the bar in accordance with the degree of turning effected. This will vary the caster angle more or less although the caster adjustment may be effected without effecting the camber adjustment by turning the control bar through one or more complete revolutions.

The stamping 35 can be easily and inexpensively made and is a simple means for mounting and clamping the control bar on the frame. It also serves as a support for the shock absorber. The control bar can be inexpensively made from bar stock in an automatic screw machine so that the cost will be minimized, particularly as compared to the cost of making bars having upset attaching ears which required forging operations. In the present invention, forging operations are not required.

Although only one form of the invention has been illustrated and described in detail, it will be apparent to those skilled in the art that various modifications may be made in the spirit of the invention and scope of the appended claims.

What is claimed is:

1. In an individual suspension for mounting a wheel on a vehicle frame, a wheel supporting arm having one end provided with separated portions, a pivot bar having axially aligned threaded ends, means on the separated arm portions threadably engaging said ends of the bar so that the arm can swing on the bar, the bar between its threaded ends having a cylindrical intermediate portion related eccentrically to the ends and said intermediate portion being provided with spaced, circumferentially extending grooves, and means for adjustably clamping the intermediate portion of the bar on the frame including bolts having their side walls engaging the grooves to prevent axial movement of the bar.

2. In an individual suspension for mounting a wheel on a vehicle frame, a wheel supporting arm having one end provided with separated portions, a pivot bar having axially aligned threaded ends, means on the separated arm portions threadably engaging said ends of the bar so that the arm can swing on the bar, the bar intermediate its threaded ends having a cylindrical portion related eccentrically to the end portions, a sheet metal shell having opposed walls provided with aligned openings receiving the intermediate portion of the bar, said shell also having slots leading to the openings, and bolts for drawing the slotted portions of the shell together so as to clamp the shell about the bar, said bar having circumferentially extending grooves engaging the sides of the bolts so as to prevent axial movement of the bar.

3. Means for connecting a wheel suspension arm and a shock absorber to a vehicle frame, comprising an inverted cup-shape sheet metal shell adapted to be connected to a vehicle frame, said shell having an integral laterally offset portion including opposed relatively thin side walls with axially aligned openings therein, each of said side walls also being provided with a slot portion intersecting the opening therein so as to render portions of each side wall on opposite sides of the slot therein contractible towards each other in lines of movement substantially parallel to the planes of the walls.

4. In an individual wheel suspension of the type having a lateral supporting arm, means for adjustably and pivotally securing the inner end of such arm to a vehicle frame for vertical swinging movement and for adjusting movement laterally of the frame including a pivot bar having its ends axially aligned and having its intermediate portion eccentrically related to the ends, the arm being pivoted to said ends, and means for adjustably securing the intermediate portion on the frame so as to normally hold it against turning and against axial movement but permitting turning thereof for adjustment of the camber angle of a wheel carried by the arms.

5. In an individual wheel suspension of the type having a lateral supporting arm, said arm having one end provided with separated portions, and means for pivotally and adjustably securing said arm to a vehicle frame comprising a pivot bar having axially aligned threaded ends, means on said separated arm portions threadably engaging said end portions of the bar so that the arm can swing on the bar, the bar between its threaded ends having a cylindrical portion related eccentrically to the threaded ends, and means for releasably clamping the intermediate portion of the bar on the frame so as normally to hold the bar against turning while permitting adjustable turning thereof in order to change the camber of a wheel carried by the arm.

6. In an individual suspension of the type having a lateral supporting arm, means for adjustably and pivotally securing the inner end of such arm to a vehicle frame, said arm having one end provided with separated portions, a pivot bar having axially aligned threaded ends, means on the separated arm portions threadably engaging said ends of the bar so that the arm can swing on the bar, the bar intermediate its threaded ends having a cylindrical portion related eccentrically to the end portions, a sheet metal shell having inwardly opposed concave side walls provided with aligned openings receiving the intermediate portion of the bar, said shell also having slots leading to said openings so as to enable clamping the shell directly against the bar portions disposed in the openings, and means for drawing the slotted portions of the shell together for clamping the bar in place.

JOHN W. LEIGHTON.

REFERENCES CITED

The following references are of record in the file of this patent:

UNITED STATES PATENTS

| Number | Name | Date |
|---|---|---|
| Re. 22,355 | Leighton | July 27, 1943 |
| 891,697 | Huff | June 23, 1908 |
| 2,096,115 | Leighton | Oct. 19, 1937 |
| 2,123,089 | Leighton | July 5, 1938 |
| 2,198,544 | Leighton | Apr. 23, 1940 |
| 2,238,879 | Dauben | Apr. 22, 1941 |
| 2,299,935 | Slack et al. | Oct. 27, 1942 |
| 2,305,174 | Leighton | Dec. 15, 1942 |
| 2,502,744 | Parker | Apr. 4, 1950 |

FOREIGN PATENTS

| Number | Country | Date |
|---|---|---|
| 506,598 | Great Britain | June 1, 1939 |